United States Patent
Van Arendonk et al.

(10) Patent No.: US 8,866,890 B2
(45) Date of Patent: Oct. 21, 2014

(54) MULTI-CAMERA

(75) Inventors: Anton Petrus Maria Van Arendonk, Waterloo (CA); Cornelis Draijer, Waterloo (CA)

(73) Assignee: Teledyne Dalsa, Inc., Waterloo, Ontario (CA)

( * ) Notice: Subject to any disclaimer, the term of this patent is extended or adjusted under 35 U.S.C. 154(b) by 284 days.

(21) Appl. No.: 13/373,121

(22) Filed: Nov. 4, 2011

(65) Prior Publication Data

US 2012/0113276 A1 May 10, 2012

Related U.S. Application Data

(60) Provisional application No. 61/456,351, filed on Nov. 5, 2010.

(51) Int. Cl.
*H04N 13/02* (2006.01)
*H04N 5/225* (2006.01)
*H04N 5/232* (2006.01)

(52) U.S. Cl.
CPC .......... *H04N 5/2258* (2013.01); *H04N 5/2253* (2013.01); *H04N 5/23238* (2013.01)
USPC ........................................................ 348/47

(58) Field of Classification Search
USPC ............................ 348/36, 332, 333.05, 42–50
See application file for complete search history.

(56) References Cited

U.S. PATENT DOCUMENTS

| | | | | |
|---|---|---|---|---|
| 5,991,437 A | * | 11/1999 | Migdal et al. | 382/154 |
| 7,009,638 B2 | * | 3/2006 | Gruber et al. | 348/218.1 |
| 7,215,364 B2 | | 5/2007 | Wachtel et al. | |
| 8,675,068 B2 | * | 3/2014 | Nixon | 348/144 |
| 2001/0010546 A1 | * | 8/2001 | Chen | 348/218 |
| 2002/0163582 A1 | | 11/2002 | Gruber et al. | |
| 2004/0085474 A1 | | 5/2004 | Trunz et al. | |
| 2007/0076107 A1 | * | 4/2007 | Nishimura | 348/294 |
| 2008/0273111 A1 | * | 11/2008 | Gustavsson et al. | 348/340 |
| 2009/0256909 A1 | | 10/2009 | Nixon | |
| 2010/0141802 A1 | * | 6/2010 | Knight et al. | 348/240.3 |
| 2010/0289941 A1 | * | 11/2010 | Ito et al. | 348/345 |
| 2010/0321511 A1 | | 12/2010 | Koskinen et al. | |
| 2011/0069189 A1 | * | 3/2011 | Venkataraman et al. | 348/218.1 |
| 2011/0128393 A1 | * | 6/2011 | Tavi et al. | 348/218.1 |
| 2011/0157351 A1 | * | 6/2011 | Pollack et al. | 348/84 |
| 2012/0313255 A1 | * | 12/2012 | Oganesian | 257/774 |

* cited by examiner

*Primary Examiner* — Lin Ye
*Assistant Examiner* — Amy Hsu
(74) *Attorney, Agent, or Firm* — Eric A. Gifford

(57) ABSTRACT

A method of making a high resolution camera includes assembling, imaging and processing. The assembling includes assembling on a carrier a plurality of sensors. Each sensor is for imaging a portion of an object. The plurality of sensors are disposed so that the portions imaged by adjacent sensors overlap in a seam leaving no gaps between portions. The imaging images a predetermined known pattern to produce from the plurality of sensors a corresponding plurality of image data sets. The processing processes the plurality of image data sets to determine offset and rotation parameters for each sensor by exploiting overlapping seams.

10 Claims, 7 Drawing Sheets

MULTI-CAMERA

The priority of the Nov. 5, 2010 filing date of provisional application No. 61/456,351 is hereby claimed.

BACKGROUND OF THE INVENTION

In a push to provide ever increasing resolution for electronic cameras, two general approaches have evolved. First, a single sensor chip is used to carry very large pixel arrays. Such single chip approach leads to very expensive chips as the number of pixels increase. A second approach is to develop a multi-chip camera where chips are disposed on a plane and where several sensor chips are butted together. With this multi-chip approach, it is difficult to achieve smooth transitions between chips. Some attempts are made to butt one chip against another chip to minimize the seam where the chips butt together. Such an approach leaves inevitable gaps. Furthermore, replacement of failed chips in such a tight array of chips is nearly impossible. What is needed is a high resolution, large format sensor that can be manufactured inexpensively and repaired as needed.

Scanning type sensors (e.g., push broom type sensors) present special problems when larger areas need to be covered. In aerial photography for example, the movement of a plane may be constant, but objects on the ground to the side of the plane's path appear to move slower (in angular terms) than other objects directly under the plane. Distortions so created become significant, particularly when a larger field of view is to be covered. Although such distortions can be corrected, the corrections takes additional processing.

The trend in aerial photography is to use area sensors and capture periodic snap shots of objects on the ground as the plane flies a fixed course. If these images are taken frequently enough, the differences in movements of where the objects appear are nearly cancelled and sharp, undistorted images result. Although the images have overlapping portions, such overlap is relatively easy to correct.

U.S. Pat. No. 6,163,339 to J. Meunier describes an electronic apparatus including a cartridge that comprises an array of focusing elements each of which has a field of vision intersecting a given area within a visible image. The cartridge further includes an array of optical sensors, each of which is optically associated with a respective one of the focusing elements. Adjacent focusing elements have fields of vision intersecting common portions of the visible image whereby substantially the entirety of the visible image is covered by combined fields of vision of focusing elements. In Meunier, a huge computer is required to compute all the pixel array information in order to reconstruct an full complete image. Meunier requires a collimator, a shutter and a pre focusing element. Meunier uses individual packaged sensors and cooling rods to drain generated heat.

U.S. Pat. No. 7,339,614 to M. Gruber et al. describes a large format digital camera systems that include multiple detector arrays with one or more single lens systems to acquire sub-images of overlapping sub-areas of large area objects. The sub-images are stitched together to form a large format digital, macro-image. Gruber's camera is designed to "capture earth surface" from a plane while the object (i.e., the earth in this case) moves in time as well the plane and for this requires actuators in each perspective center. Gruber uses four perspective centers, with one subsystem per perspective center, to stitch images together.

Given this interest in area sensors, there has developed a trend towards high resolution imagers with extremely large Fields of View. When large Field of View sensors with a high resolution are employed, an aerial photographing plane can operate at higher altitude which is beneficial in hostile situations. Large area sensors allow for instant situation awareness when compared to scanning type sensors that require post scan reconstruction of an image. In this way, scanning type sensors limit imaging flexibility. It is desirable to create large area and multi-spectral sensors that have high resolution, are fast and can be manufactured with reasonable yield.

SUMMARY OF THE INVENTION

In an embodiment, a method of making a high resolution camera includes assembling, imaging and processing. The assembling includes assembling on a carrier a plurality of sensors. Each sensor is for imaging a portion of an object. The plurality of sensors are disposed so that the portions imaged by adjacent sensors overlap in a seam leaving no gaps between portions. The imaging images a predetermined known pattern to produce from the plurality of sensors a corresponding plurality of image data sets. The processing processes the plurality of image data sets to determine offset and rotation parameters for each sensor by exploiting overlapping seams.

BRIEF DESCRIPTION OF DRAWINGS

The invention will be described in detail in the following description of preferred embodiments with reference to the following figures.

DETAILED DESCRIPTION OF PREFERRED EMBODIMENTS

The present inventors have discovered an approach to making large area, high resolution sensors that employs assembling smaller and low cost sensors on a large substrate that serves as a sensor carrier. The substrate is fabricated to have necessary connections to allow for a fast, parallel and synchronized readout of the individual sensors. Moreover, the substrate preferably matches expansion coefficients of the sensors. The substrate manufacturer is also preferably compatible with known IC manufacturing technologies so as to allow the addition of 'signal intelligence' circuits to the substrate. Such circuits include, but are not limited to, multiplexing input addresses and output signals. Embodiments include an array of area sensors mounted on a carrier. The optical distribution of the larger image can be by either Fiber Optic Tapers or Relay lenses.

Figure 6:
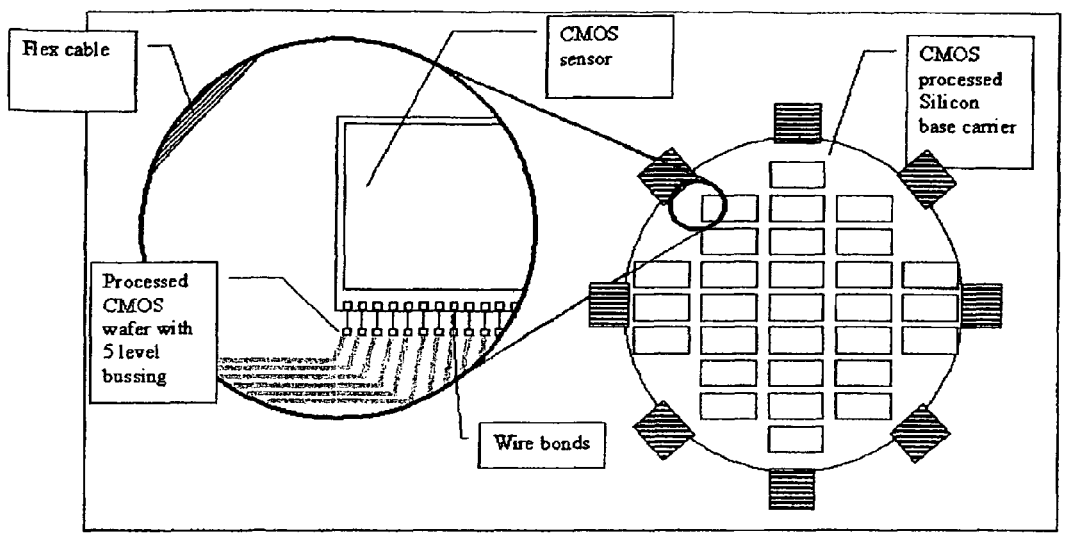
FIG. 6 is a plan view depicting an array of sensors mounted on a typical semiconductor wafer that is used as a carrier and showing a wire bond technique connected to interconnect traces on the substrate.
Figure 7:
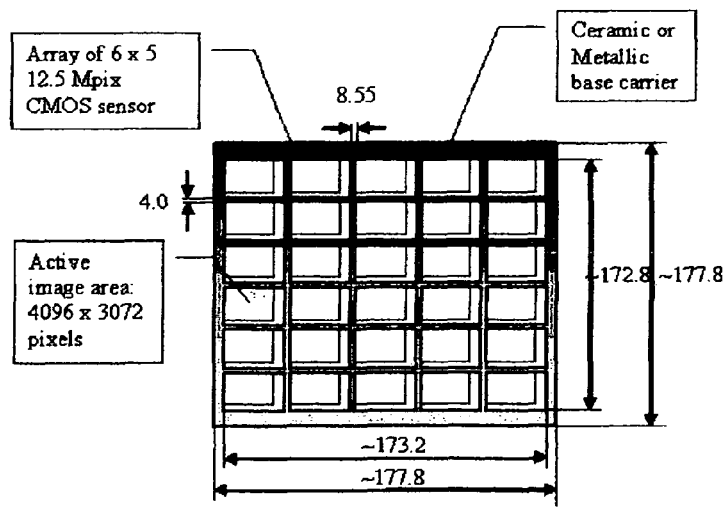
FIG. 7 is a plan view depicting an array of sensors mounted on a ceramic or metal substrate that is used as a carrier.

FIG. 6 illustrates an array of sensors mounted on a typical semiconductor wafer that is used as a carrier. Note the compatibility with multilevel wiring, wire bonding with chips and flex cables for off wafer connections. FIG. 7 illustrates an array of sensors mounted on a ceramic or metal substrate that is used as a carrier. Such carriers are also compatibility with multilevel wiring, wire bonding with chips and flex cables for off substrate connections.

Figure 1:
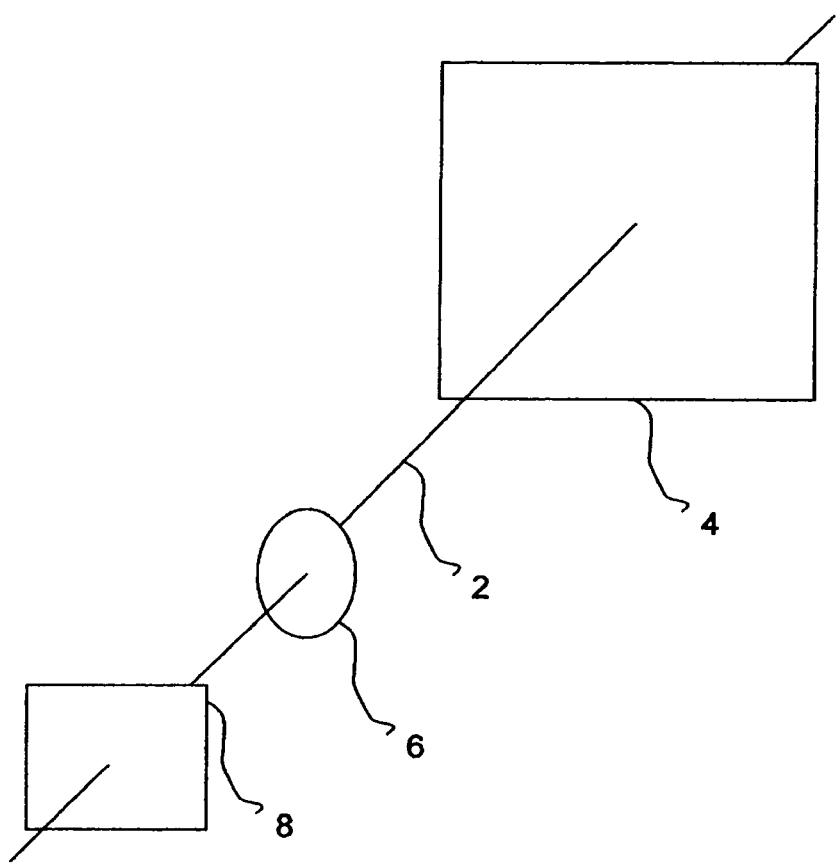
FIG. 1 is a schematic diagram depicting the relationship between object and image conjugate.

In FIG. 1, an object 4 to be imaged is imaged by lens or lens system 6 and focused on an image conjugate plane 8. Object 4, lens or lens system 6 and image conjugate plane 8 are arranged in a straight line. Generally, but not necessarily, the extent of object 4 in any direction is greater than an extent of a corresponding image conjugate of the object in the same direction that lies in image conjugate plane 8. The size of image conjugate 8 is proportional to the size of object 4, and the proportionality constant is determined by the lens or lens system 6.

Figure 2:
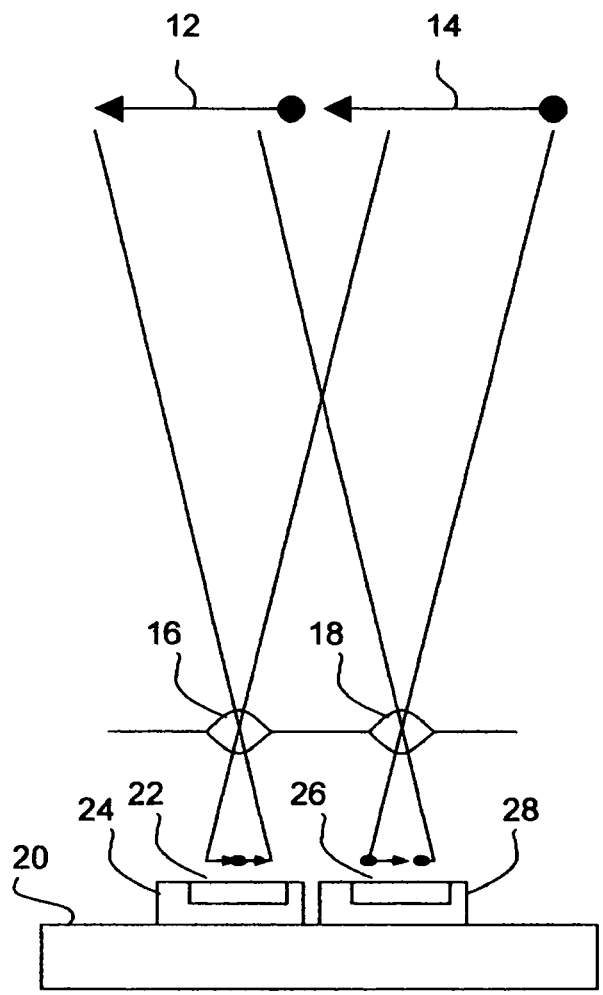
FIG. 2 is a schematic diagram depicting the optics of adjacent mini-cameras.

In FIG. 2, a sectional view through two mini-cameras are depicted, although more mini-cameras may be employed. A first mini-camera includes lens or lens system 16 and image sensor 24. In operation, the first mini-camera images a portion of the object, represented here as arrows 12 and 14. Lens or lens system 16 focuses arrow 12 and the head of arrow 14 from the object onto an active region 22 of sensor 24. A single lens and most lens systems invert the image conjugate of the object as depicted in FIG. 2 as a horizontal flip.

Disposed adjacent to the first mini-camera is a second mini-camera that includes a lens or lens system 18 and image sensor 28. In operation, the second mini-camera images a portion of the object, represented here as arrows 12 and 14. Lens or lens system 16 focuses arrow 14 and the tail of arrow 12 from the object onto an active region 26 of sensor 28. The single lens or lens system inverts the image conjugate of the object as depicted in FIG. 2 as a horizontal flip.

Sensors 24 and 28 are mounted on a carrier 20. The optical design is such that the field of view of each mini-camera focuses the image conjugate of a portion of the object on the active area of its respective sensor, and the first mini-camera images a portion of the object that overlaps a portion of the object that is imaged by the second mini-camera. As depicted in FIG. 2, the overlap portion includes the head of arrow 14 and the tail of arrow 12. Each of sensors 24 and 26 images both the head of arrow 14 and the tail of arrow 12. Since the optics inverts the image conjugate, the electronic image data that is read out of each sensor is flipped again in a processor or flipped again by the order of readout to undo the inversion cause by the optics.

These sensor may be either CMOS or CCD area sensors. These sensors are positioned on carrier 20 so that the image conjugate is fully covered by the active areas of the sensors, and at the seams between sensors, the imaged portion of the object is imaged by both adjacent sensors. The output from each of the sensors is provided to processor 60 which may be mounted on carrier 20 or separate from carrier 20. The separate images from the sensors are combined in processor 60.

Figure 9:
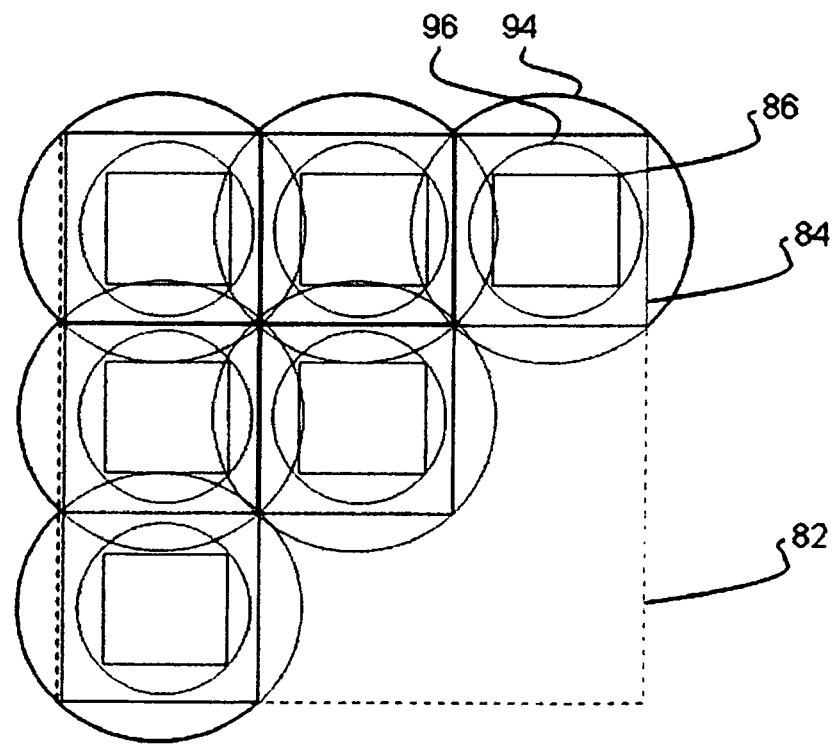
FIG. 9 is a plan view of an object to be imaged showing the object parsed into sub-objects.

FIG. 9 depicts a plan view of an object 82 to be imaged. Object 82 is parsed into an array of sub-objects, sub-object 84 being typical. In FIG. 9, there are depicted 6 sub-objects and another 3 sub-objects are suggested by the array for a total of 9 sub-objects in a 3 by 3 array. In FIGS. 2 and 9, lens 16 focuses a circular image containing sub-object 84 on an image sensor 24 as a circular image-conjugate 96 that covers active imaging area 22 of image sensor 24.

During manufacturing, sensors 24 and 28 of FIG. 2 may be mounted on carrier 20 with displacement and/or rotational errors. Small errors are a reality. Manufacturing tolerances make such errors almost inevitable. Processor 60 corrects for these errors.

Figure 3:
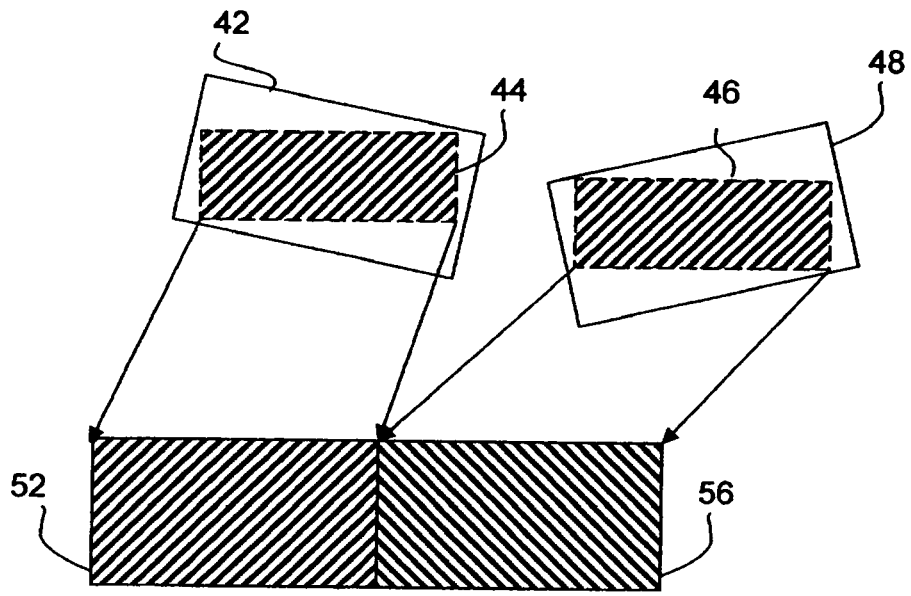
FIG. 3 is a schematic diagram depicting the processing of image data from adjacent mini-cameras.

In FIG. 3, a sensor is mounted with rotational and displacement errors so that the active areas are askew as depicted at 42 and 48. Processor 60 extracts corrected areas 44 and 46 out of active areas 42 and 48. The extracted areas are stored within the processor's memory at locations 52 and 56. Image data from each sensor is corrected in this way. A stitching algorithm smoothes the seam between adjacent sensor image data. In this way, the output of processor 60 appears to be from a much wider format sensor with greater resolution than could be achieved with a comparable cost single sensor. Clearly, two or more sensors may be stitched together in this way to provide the function of a much larger sensor.

Large format sensors are expensive due in part to low manufacturing yield. The technique described herein allows for the same functionality but with less expensive sensors. There is no need to try to butt one sensor exactly adjacent to another. This function is achieved in processor 60. Furthermore, if one of the sensors should later fail or be detected to have a defect, it is possible to replace a single sensor out of the plural sensors at a minimum cost.

Most sensors are based on silicon technology. When silicon based sensors are used, a silicon carrier is recommended to match the coefficient of thermal expansion. It is at least preferred that the carrier have a similar coefficient of thermal expansion to that of the sensor, whatever the sensor is made of.

When a silicon based carrier 20 is used with silicon based sensors, the carrier by itself can have active semiconductor regions. For example, processor 60 might be implemented in the silicon carrier 20. Other functions implemented on the carrier might include correlated double sampling, multiplexing or other techniques because the carrier is fully compatible with IC manufacturing processes. Alternatively, the processor might a separate chip mounted on a surface of silicon carrier 20 opposite to the surface on which sensors are mounted and connected through carrier 20 with through-silicon vias (TSVs). Furthermore, silicon carriers can mount surface mounted devices, components and flat cable attachments.

Processor 60 can only correct the displacement and rotational errors in the location of sensors if the processor knows precisely where the sensors are. This is achieved at the end of the assembly process. Once the carrier module is assembled, the sensors are used to image a known calibration pattern used as the object. The processor examines the image data produced by the sensors from the image conjugate of the known calibration pattern. From this calibration process, the exact location and orientation (e.g., rotation) of each sensor is determined. These calibration parameters are stored in a non-volatile memory. Then, when the carrier module is used during normal image scanning, the processor uses the calibration parameters to correct displacement and rotational errors in the sensor image data. The processor then stitches together all seams to provide a wide format, high resolution image.

In an alternative embodiment, carrier 20 is a base carrier fabricated from Covar™ or similar material with a coefficient of thermal expansions matched as nearly as possible to the silicon based sensors 24 and 28. The sensors are spaced as depicted in FIG. 2 so that it is easy to replace a non-functioning sensor and re-image a test pattern to calibrate the sensor system. Manufacturing tolerances for positioning the sensors are relaxed because the exact final positions are determined by calibration and the image data from the several sensors are stitched together.

Figure 4:
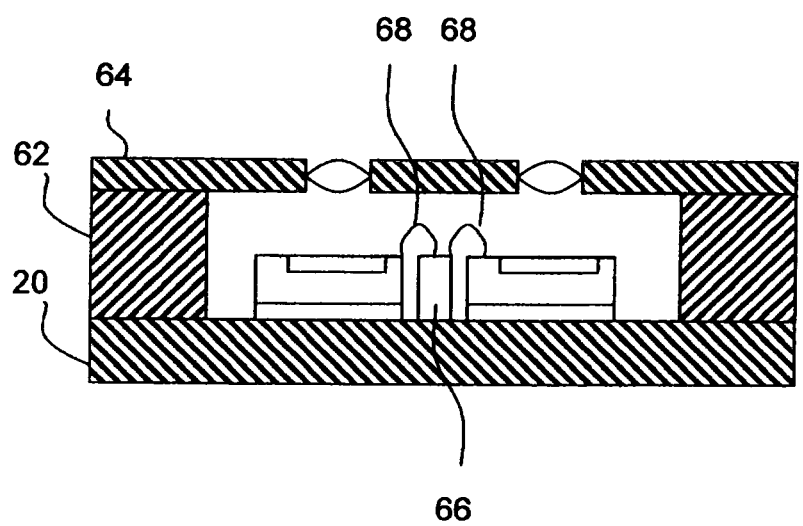
FIG. 4 is a section view depicting further structure of adjacent mini-cameras.

FIG. 4 depicts a section through the structure depicted in FIG. 2, but shows that mounting structure as well. Interconnecting wires between sensors, components, flat cable attachments, etc. are provided in the spaces between individual sensors. Multi-layer interconnect traces 66 can be formed as thin or thick film structures directly on the base carrier 20. The image sensors may be attached by epoxy glue to the base carrier and connected by known wire bonding 68 to the interconnect traces 66. Spacers 62 mounted on carrier 20 support the lens substrate 64. Preferably, the lens substrate 64, spacers 62 and carrier are fabricated from materials having similar or identical coefficients of thermal expansion. Lens substrate 64 may, for example, be aligned with respect to carrier 20 using techniques known for aligning masks with respect to semiconductor substrates. Once aligned and fully tested, an encapsulant could be used to fill the gap between carrier 20 and lens substrate 64 in order to enhance mechanical stability.

Figure 5:
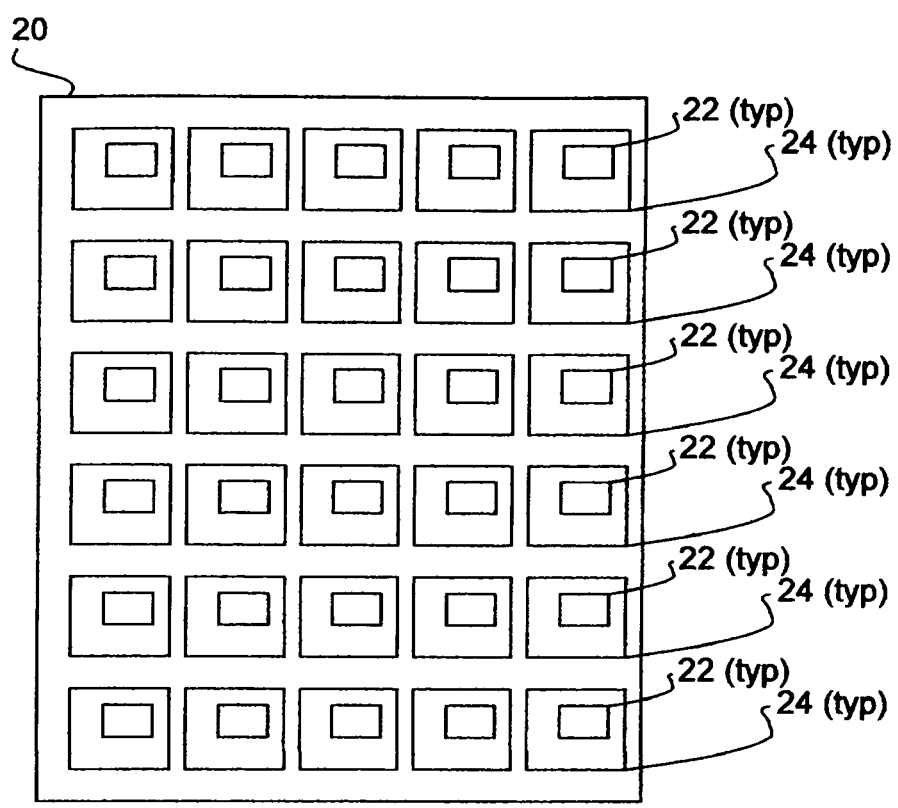
FIG. 5 is a plan view depicting an array of sensors mounted on a carrier.

FIG. 5 depicts a five by six sensor array mounted on carrier 20. Each sensor 24 includes and active area 22. Overlaying this array of sensors is an array of lenses or lens systems 16 (see FIG. 2). Each lens of the array is disposed to focus a portion of the object as an image conjugate on the active area 22. The array of portions of the object that are focused on the array of active regions 22 include overlapping areas of the portions of the object at the seam between each adjacent sensor. Processor 60 corrects the imaged data from each sensor and stitches together the array of imaged data into one seamless large format, high resolution image.

In a variant of the present multi-camera, carrier 20 is a silicon substrate to help removed heat. In contrast, U.S. Pat. No. 6,163,339 to Meunier requires cooling rods to drain heat from the array. The silicon substrate of the present variant is able to drain the heat by itself. A silicon substrate has a conductivity of approximately 17 W/mK. Furthermore, individual sensors are electrically connected by wire bonding techniques directly to interconnect traces on the silicon substrate that is the carrier 20, thus eliminating intermediate interconnections and improving reliability. In still other variants, the silicon substrate that is the carrier 20 includes through-silicon vias to afford more direct, high speed electrical connection between image sensors 24 mounted on the obverse surface of carrier 20 to other circuitry, for example processors 60, mounted on the reverse surface of carrier 20.

In yet another embodiment of the invention, sensors are assembled on a carrier as described herein. Each sensor is operable to image a portion of an object when a suitable lens is disposed over the active area of the sensor.

After the sensors have been affixed to their carrier, a nominal lens carrier with lenses is temporarily and reversibly affixed to and disposed over the sensors and carrier module in a rough predetermined displacement and orientation. The predetermined displacement and orientation is achieved with known or yet to be developed registration techniques. For example, known registration marks may be used. In this way, the nominal lens carrier is disposed over the sensor carrier so that lenses within the lens carrier focus portions of the object on the active areas of the sensors. The portions imaged by adjacent sensors at least partially overlap at a seam leaving limited or no gaps between portions.

At this, stage, it is not necessary that the array of sensors be able to image completely overlapping seams with all adjacent sensors. It is only needed that sufficient overlap exist so that accurate displacement and orientation can be measured for each sensor. Small gaps in coverage are not fatal. One or two pixel overlap is sufficient to ensure that the sensor system never misses any optical information. This makes the process of reconstructing the image much easier. Although image reconstruction processing may be easier, physically aligning the captured images so that there is a 1 or 2 pixel overlap requires more precise assembly processes and careful material selection than would otherwise be required.

Figure 8:
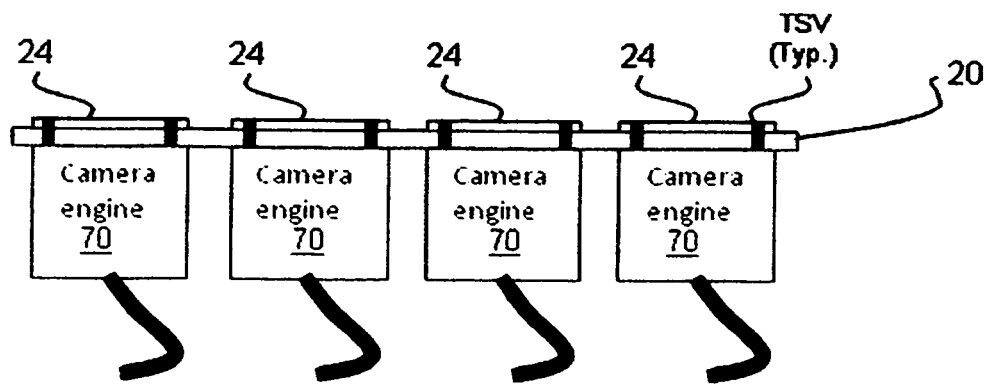
FIG. 8 is a section view of a sensor array of another embodiment.

In FIG. 8, a section view of a sensor array, similar to FIG. 5, is depicted with carrier 20 on an obverse surface of which is mounted four image sensors 24 that are electrically connected using through-silicon vias (TSVs) to the reverse surface of carrier 20. A TSV is a vertical electrical connection passing completely through a silicon wafer and/or die and constitutes a high performance technique to create very fast three dimensional integrated circuits. With TSVs two or more integrated circuit chips can be stacked vertically so that they occupy less space and/or have greater connectivity, more direct connections and operate at higher speeds. FIG. 8 depicts plural camera engines 70 mounted on the reverse side of carrier 20 and electrically connected to respective image sensors with TSVs. Camera engine 70 may be a digital signal processor but more commonly is a specialized integrated circuit of the type known as image processors (e.g., processor 60 as generally discussed herein). Preferably, camera engine 70 performs the de-rotation and translation function that properly aligns the plurality of image data sets captured by the corresponding plurality of image sensors. In combination of the Giga-pixel camera techniques described herein, new functionality is created, for example, due to very short interconnections with TSVs between image sensors and corresponding image processors so high speed data transfer can be used, therefore high frame rates become one of its many benefits.

Figure 10:
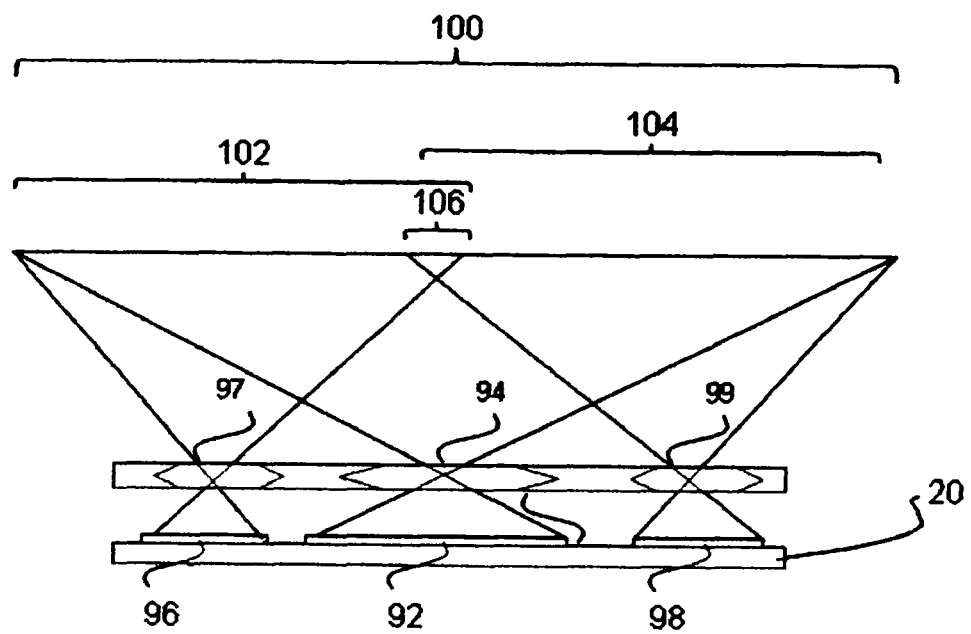
FIG. 10 is an optical schematic view of a representative hyper-spectral system.

FIG. 10 depicts an optical schematic view of a representative hyper-spectral system. In FIG. 10, type 1 image sensor 92 is mounted on carrier 20 to image through lens 94 the whole of an object that has an extent 100. Also, type 2 image sensor 96 is mounted on carrier 20 to image through lens 97 only portion 102 of the whole of the object that has the extent 100, and type 2 image sensor 98 is mounted on carrier 20 to image through lens 99 only portion 104 of the whole of the object that has the extent 100. Portions 102 and 104 overlap by portion 106. Type 1 and type 2 sensors are different. For example, type 1 sensors may be an InGaAs sensor for imaging infrared or a sensor (or lens) having a separate overlaying wavelength pass band filter of a predetermined wavelength pass band. Meanwhile, type 2 sensors may be RGB sensors with RGB micro-filters covering the underlying sensor with a Bayer pattern.

In an image processor, the image data set from sensor 96 is de-rotated and translated according to parameters predetermined during system calibration at manufacture. Furthermore, the image data set from sensor 98 is de-rotated and translated according to parameters predetermined during system calibration at manufacture. The de-rotated and translated image data sets from the image sensors are then stitched together to provide large format image data.

In addition, the image data set from sensor 92 is de-rotated and translated according to parameters predetermined during system calibration at manufacture, and the de-rotated and translated image data from sensor 92 is overlaid on the stitched together large format image data from sensors 96 and 98. In an exemplary variant, sensor 92 is an InGaAs sensor for imaging infrared and sensors 96 and 98 image in the visible spectrum, for example a sensor that produces RGB images using a Bayer pattern. Other combinations of hyper-spectral images are achievable according to this technique.

In FIG. 10, note in particular that lens optics are arranged so that an object that has an extent 100 is simultaneously imaged twice. The first image is captured by sensor 92 that captures the whole of the object that has the extent 100. The first image may be captured from a first type of sensor, for example an InGaAs sensor for imaging infrared. The second image is captured by the combination of sensors 96 and 98 that together and with de-rotation, translation and capture are able to capture the whole of the object that has the extent 100. The second image may be captured from a second type of sensor, for example an RGB sensor for imaging visible light with a Bayer pattern of micro-filters overlaying the image sensor.

Although specific example of optics are depicted in FIG. 10 where image data sets from one type of image sensor are stitched together, but only one image data set from another type of image sensor is needed to cover the whole object to be imaged, other variants have different optical configurations. For example, another variant has a first image data set from one type of image sensor imaging an object in a first portion of the spectrum and has a second image data set from another type of image sensor imaging the same object in a second portion of the spectrum, the first and second image data sets having been stitched together from respective plural sub-image data sets. The first and second stitched together image data sets are then overlaid on one another to produce a hyper-spectral image responsive to the first and second portions of the spectrum.

In another embodiment, an extension of the camera with two types of image sensors is a camera with three or more types of image sensors, each type of image sensor for imaging a respective portion of the spectrum. Each type of image sensor is constituted by one or more individual image sensor chips 24 mounted to carrier 20 and arranged within an array on carrier 20. When a type of image sensor is constituted by a single image sensor chip, it is associated with lens optics such as that depicted in FIG. 10 by lens 94 to cover the whole of an object that has an extent 100. When a type of image sensor is constituted by plural image sensor chips, they are arranged in an array on carrier 20 and associated with an array of respective lenses having optics such as that depicted in FIG. 10 by lenses 97 and 99 to collectively cover the whole of an object that has an extent 100.

Each type of sensor is selected for a particular and different portion of the spectrum. A sensor type may be specifically for an RGB visible color spectrum, an infrared spectrum, or an ultra violet and/or short wavelength visible spectrum (e.g., wavelengths shorter than 450 micrometers) such as a VIS band (e.g., the visual range of ultraviolet wavelength, usually <450 nm).

To achieve highly accurate pitch and rotation alignment for each individual sensor, two fiducials on the substrate are used to align each sensor as long as the assembly tool can find the fiducials within its alignment range. However in a particular variant of the present method, a stepper is used to create an array of alignment fiduals on the substrate so that nearby fiducials can always be found for each sensor device position. This helps achieve highly accurate pitch and rotation for each of the individual sensors.

Then as a final stage of manufacture, a predetermined known pattern is imaged to produce from the sensors a corresponding image data set for each sensor. The image data sets are analyzed in a processor to determine offset and rotation for each sensor by exploiting the portions of the image data sets that are overlapping at seams where they exits.

Having determined the offset and orientation of the optical center of the active areas of each sensor, a custom lens carrier is then fabricated by cutting holes in an uncut lens carrier, preferably with a laser cutting system, at the exact displacement of the optical center of the active areas of each sensor. The hole diameter is sized to support a mini lens to be inserted in the lens carrier.

The temporary lens carrier and lenses are removed and the custom lens carrier is aligned and affixed to the sensor carrier. With the custom lens carrier affixed and lenses are in their measured locations, the portions of the object imaged by the sensors should form a complete set of overlapping "tiles" so that seams exist between all sensors. The predetermined known pattern is then re-imaged to produce from the sensors a corresponding image data set for each sensor. The image data sets are re-analyzed in a processor to determine the final offset and rotation for each sensor by exploiting the portions of the image data sets that are overlapping at seams where they exits.

The alignment of the custom lens carrier, and also the temporary lens carrier, with the sensor carrier is made by known or yet to be developed methods. For example, conventional registration marks may be used. Alternatively, stepper alignment features may be etched into the oxide or silicon of the carrier.

It should be recognized that it is not necessarily desired that all mini lenses be the same. The camera described herein may include an optical system of which the mini lenses are only a part. A primary lens or lens system might be used in front of the mini lenses to collect light from the object and focus it on the array of mini lenses. In such a case, spherical distortions caused by a primary lens might be ameliorated by careful selection of mini lenses that differ from one another according to their distance from a central axis of the primary lens.

The mechanical stability of the lens carrier with respect to the sensor carrier is enhanced by filling the gap between the two carriers with an encapsulate material assuming the mini lenses are bonded to the lens carrier prior to deploying the encapsulate material.

Based on currently achievable but highly accurate assembly techniques and using materials that have the same or a nearly matched thermal coefficient of expansion (TCE), the sensors can be placed on the carrier in a way that the plural images produced will overlap one another by only 1 to 2 pixels at the narrowest overlap. In fact, placement alignment accuracy of about +1-0.5 microns is achievable since all major processes are defined by lithographic and etch steps. With +1-0.5 micron accuracy and with pixels that average 10 microns on a side, the overlap of the images can even be controlled to be only a fraction of a pixel. However, fractional pixel overlap of images present different challenges to stitching algorithms that stitch together adjacent images. Therefore, sensor chips are preferably placed on the carrier so that the images produced precisely overlap one another by only 1 to 2 whole pixels. Furthermore, focusing elements (e.g., lenses and their mounts) use thermally stable materials that have dimensions stably defined with very tight tolerances in the Z-direction (i.e., the out of plane direction) so that, in combination with optical designs using sufficiently large focal depths, special optical focusing elements and other optical elements are not required.

Due to the thermal stability of the individual sensors in the multi-camera, particularly when carrier 20 is itself a silicon wafer, the imaging of a predetermined known pattern to capture in a plurality of sensors a corresponding plurality of image data sets need be done only once at calibration time during a manufacturing setup stage. The offset and rotation parameters for each sensor are then calculated from the plurality of image data sets by exploiting overlapping seams of 1 or 2 pixels that are needed to precisely reconstruct the predetermined known pattern. Then the offset and rotation parameters are permanently saved in, for example, a flash memory that is affixed to the carrier. When the multi-camera is thereafter used, the plural captured images are easily de-rotated and offset with minimal additional computing capacity. With this multi-camera technology, a Giga-pixel camera is now possible.

Having described preferred embodiments of a novel large format camera made from an array of mini-cameras (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A method of providing large format image data comprising:
    providing a high resolution camera, said camera comprising a plurality of discrete sensor chips assembled on the surface of a carrier, a plurality of corresponding image processors, electrical connections on the carrier for parallel and synchronized readout of the sensor chips to the corresponding image processors, each said image processor storing predetermined offset and rotation parameters for the connected sensor chip, and electrical connections on the carrier for parallel and synchronized readout of the image processors;
    imaging an unknown object to produce from the plurality of sensor chips a corresponding plurality of overlapping image data sets;
    parallel and synchronized readout and processing of the plurality of overlapping image data sets at the respective image processors based on the predetermined offset and rotation parameters to produce a de-rotated and translated image data set for each sensor chip;
    parallel and synchronized readout of the de-rotated and translated image data set from the plurality of image processors, and
    stitching together the de-rotated and translated image data sets from all sensors to provide large format image data.

2. A method according to claim 1, wherein:
    the plurality of sensor chips are of a first technology type configured to image the unknown object in a first portion of a spectrum;
    the camera further comprises at least one additional discrete sensor chip of a second technology type different than said first technology type;
    the at least one additional sensor chip images the unknown object in a second portion of the spectrum to produce a corresponding additional image data set, wherein said first and second portions are different portions of the spectrum; and
    processing the additional image data set based on predetermined offset and rotation parameters to produce a de-rotated and translated additional image data set aligned with and overlaid over the large format image data to form a large format multi-spectral image.

3. A method according to claim 2, wherein the plurality of sensor chips are Si-based chips and the at least one additional sensor chip is an InGaAs-based chip.

4. A high resolution camera comprising:
    a carrier;
    an array of discrete sensor chips mounted to an obverse surface of the carrier, the array of discrete sensor chips being operable to image an unknown object to produce a corresponding plurality of overlapping image data sets;
    a corresponding array of image processors mounted to a reverse face of the carrier, each said image processor storing offset and rotation parameters for the corresponding sensor chip for processing the plurality of overlapping image data sets to produce a de-rotated and translated image data set for each sensor chip in the array;
    an array of through-carrier vias providing electrical connection from each said sensor chip to the corresponding image processor for parallel and synchronized readout of the sensor chips to the corresponding image processor;
    electrical connections on the carrier for parallel and synchronized readout of the de-rotated and translated image data sets from the array of image processors; and
    means for stitching together the de-rotated and translated image data sets from all discrete sensor chips to provide large format image data.

5. A high resolution camera according to claim 4, wherein the array of discrete image chips is are of a first technology type operable to image the unknown object in a first portion of a spectrum, the camera further comprising:
    at least one additional discrete sensor chip of a second technology type different than said first technology type mounted to the obverse surface of the carrier, the at least one additional sensor being operable to image the unknown object in a second portion of the spectrum different from said first portion to produce a corresponding additional image data set; and
    means for processing the additional image data set based on predetermined offset and rotation parameters to produce a de-rotated and translated additional image data set aligned with and overlaid over the large format image data to form a large format multi-spectral image.

6. A high resolution camera according to claim 5, wherein the array of discrete image chips are Si-based chips and the at least one additional discrete sensor chip is an InGaAs-based chip.

7. A high resolution camera according to claim 6, wherein the carrier is a Si-based carrier.

8. A high resolution camera comprising:
    a carrier;
    a plurality of discrete sensor chips mounted on the carrier, the plurality of discrete sensor chips being of a first technology type operable to image an unknown object in a first portion of an optical spectrum to produce a corresponding plurality of overlapping image data sets;
    at least one additional discrete sensor chip mounted on the carrier, the at least one additional discrete sensor chip being of a second technology type operable to image the unknown object in a second portion of the optical spectrum to produce an image data set, wherein said first and second portions are different portions of the spectrum;
    a corresponding array of image processors mounted on the carrier, each said image processor storing offset and rotation parameters for the corresponding sensor chip for processing the plurality of overlapping image data sets to produce a de-rotated and translated image data set for each sensor chip in the array;
    means for stitching together the de-rotated and translated image data sets from the plurality of said discrete sensor chips to provide large format image data in said first portion of the spectrum; and means for aligning the de-rotated and translated additional image data set in said second portion of the spectrum with and overlaid over the large format image data to form a large format multi-spectral image.

9. A high resolution camera according to claim 5, wherein the array of discrete image chips are Si-based chips and the at least one additional discrete sensor chip is an InGaAs-based chip.

10. A high resolution camera according to claim 6, wherein the carrier is a Si-based carrier.

\* \* \* \* \*